United States Patent [19]

Coplan

[11] Patent Number: 4,676,808
[45] Date of Patent: Jun. 30, 1987

[54] MODULE FOR MULTISTAGE GAS SEPARATION

[75] Inventor: Myron J. Coplan, Natick, Mass.

[73] Assignee: Albany International Corp., Menands, N.Y.

[21] Appl. No.: 811,013

[22] Filed: Dec. 18, 1985

[51] Int. Cl.⁴ .............................................. B01D 53/22
[52] U.S. Cl. .......................................... 55/158; 55/16
[58] Field of Search .................. 55/16, 158; 210/497.1

[56] References Cited

U.S. PATENT DOCUMENTS

| | | | |
|---|---|---|---|
| 3,019,853 | 2/1962 | Kohman et al. | 55/16 |
| 3,252,272 | 5/1966 | Hazen et al. | 55/158 |
| 3,307,330 | 3/1967 | Niedzielski et al. | 55/16 |
| 3,794,468 | 2/1974 | Leonard | 55/158 X |
| 4,025,425 | 5/1977 | Croopnick et al. | 55/16 X |
| 4,207,192 | 6/1980 | Coplan et al. | 55/158 X |
| 4,208,902 | 6/1980 | Kim et al. | 55/158 X |
| 4,225,439 | 9/1980 | Spranger | 55/158 X |
| 4,237,596 | 12/1980 | Hughes et al. | 55/158 X |
| 4,261,829 | 4/1981 | Spranger | 55/158 X |
| 4,293,419 | 10/1981 | Sekino et al. | 55/158 X |
| 4,351,092 | 9/1982 | Sebring et al. | 210/497.1 X |
| 4,352,736 | 10/1982 | Ukai et al. | 55/158 X |
| 4,508,548 | 4/1985 | Manatt | 55/158 |

*Primary Examiner*—Robert Spitzer
*Attorney, Agent, or Firm*—Kane, Dalsimer, Sullivan, Kurucz

[57] ABSTRACT

A module for gas separation is disclosed having at least one inlet port, and several permeate outlet ports. The module is provided with a bundle of fibers having permeable wall, said bundle being partitioned into several sections, each connected to a respective permeate outlet port. As a composite gas is forced to flow through the bundle, portions of it penetrate the fiber wall and flow to the several output ports. The permeate gases at the several outlet ports differ in concentration.

8 Claims, 5 Drawing Figures

MODULE FOR MULTISTAGE GAS SEPARATION

BACKGROUND OF THE INVENTION

1. Field of Invention

This invention pertains to a method and module for separating a composite gas into separate permeates with different levels of concentrations.

2. Description of the Prior Art

It is well known to use hollow monofilaments or fibers in various procedures for separating fluids and particularly gases due to their relative permeabilities through the hollow fiber substance. Typically, the fibers are formed into a cylindrical bundle to provide a large surface or contact area. The bundle is encased in a pressure shell providing an assembly which is commonly referred to as a module. Pressurized gas is fed into the shell and some of the gas permeates through the walls of the fibers and is bled off from the module as a permeate. The remaining gas is also bled off from the module as a residue or raffinate. The compositions of the permeate and raffinate are different from each other and from that of the feed mixture due to the selectivity of the hollow fiber wall substance. The fraction of the feed which is bled off as permeate is called the stage cut.

It has been found that while a single module may separate gases effectively at low stage cuts, the efficiency of separation declines with increasing stage cut. Therefore various schemes have been devised for processing the original feed and consequent residue gases of modules by staging two or more modules in series. Each module is characterized by permeate and residue gases of different concentrations and compositions. Obviously such arrangements require several modules which take time and effort and are costly to manufacture, and additionally they must be interconnected by piping.

OBJECTIVES AND SUMMARY OF THE INVENTION

An objective of the present invention is to provide a method of obtaining from a single module several permeate gases of different concentrations, and a module to be used for said method.

Another objective is to provide a module wherein the composite gas flows perpendicularly with respect to the flow of the permeate gases. Other objectives and advantages shall become apparent in the following description of the invention.

According to this invention, a module for separation of a composite has comprises a tubular bundle of fibers having walls permeable to a portion of a composite gas. The fibers are wound around a shaft to form a plurality of concentric laminae. The bundle is partitioned into several annular sections, each section having a permeate collection zone. The sections are arranged concentrically and the composite gas flows past each section sequentially. Thus the permeate gases obtained at the different collection zones differ in concentration.

DETAILED DESCRIPTION OF THE INVENTION

Figure 1:
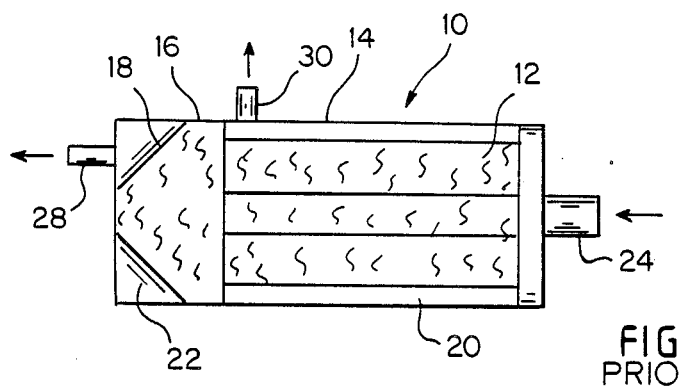
FIG. 1 shows a typical cross-sectional view of a prior art module with a single permeate output.
Figure 2:
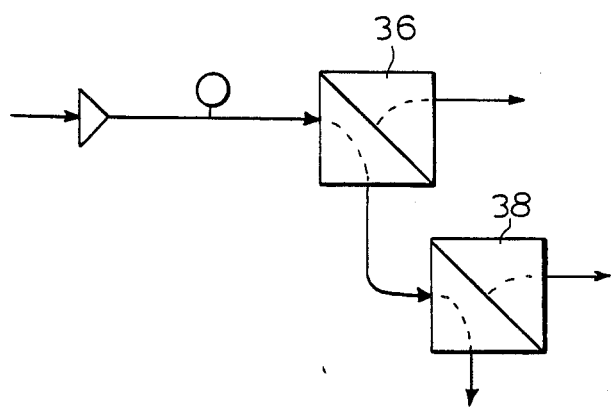
FIG. 2 shows a typical scheme of staging such a prior art module.

In order to render a better understanding of the invention, a typical prior art module is illustrated in FIGS. 1 and 2 and some staging schemes are described.

As previously stated, there are many types of modules known in the prior art. One typical example is shown in FIG. 1, module 10 comprises a tubular bundle of fibers 12 encased in a shell 14. Essentially the bundle comprises a plurality of cylindrical laminae, each lamina being radially superimposed on the preceeding lamina. Each lamina comprises a single fiber wound axially to form a continuous helix. The whole bundle is made of either groups of fibers or a single continuous fiber by using standard methods well known in the textile arts. After the bundle is completed, it is traditionally potted at least at one end 16 and then the fibers of each lamina are cut at 18. Shell 14 is also cylindrical and is slightly larger than the bundle 12 so that when the bundle is inserted and axially secured within the shell a cylindrical space 20 is left between the bundle 12 and the inner side wall of shell 14. A collection zone for permeate 22, is provided at the end of the bundle, 16, as shown. The space 20 and collection zone 22 do not communicate with each other. Typically a pressurized composite gas is introduced into the "FEED" inlet tube 24 of the module which is perforated along its length and is disposed axially in the bundle. The composite feed gas flows radially outward over the fibers of the laminae toward outer space 20. As perviously mentioned the fibers are hollow and due to the cut 18 they communicate with annular space 22. The fibers are made of a material which is at least partially permeable to at least one of the gases that form the composite gas. As the composite gas flows past the fibers, a proportion of the feed gas enriched in the more highly permeable gases permeates the fibers and flows through the bores of said fibers to space 22. From space 22 the permeate gases are removed through outlet 28. The gases which pass through the bundle without penetrating the fibers collect in space 20 and are removed through one or more RESIDUE oulets such as 30.

As previously mentioned, it has been found that it is advantageous to interconnect several modules to complete the gas separation process. In such schemes the gas separation is accomplished in stages, each stage being performed by a separate module. Such a scheme is illustrated in FIG. 2. In this scheme, the residue gases left over from the first separation in module 36 are fed into second module 38. The residue gas from the first module normally has essentially the same pressure as the initial feed. The permeates from modules 36 and 38 differ in composition.

Figure 3:
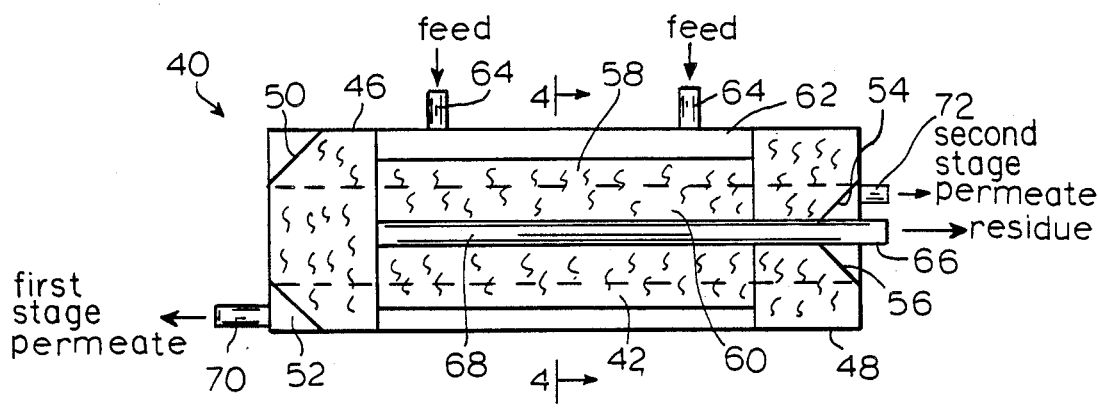
FIG. 3 shows a longitudinal cross-sectional view of a module constructed according to this invention with two permeate outputs.
Figure 5:
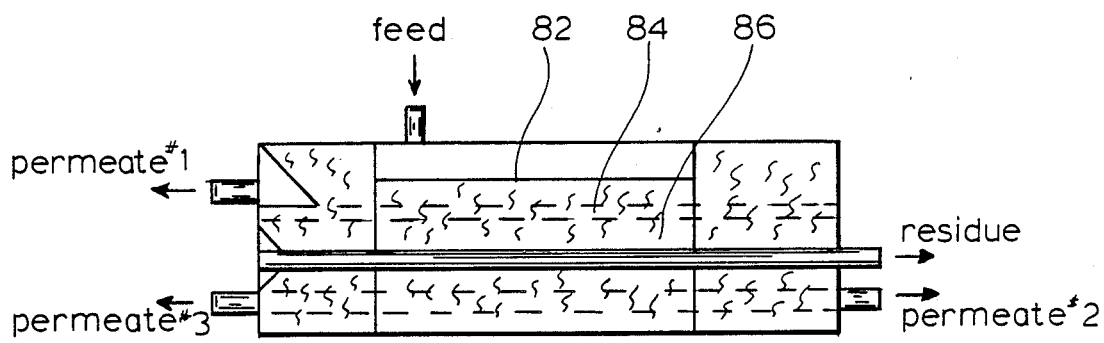
FIG. 5 shows another embodiment of the module constructed in accordance with this invention with three permeate outputs.
Figure 4:
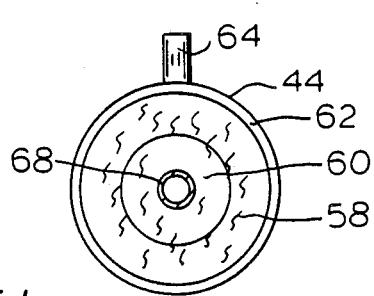
FIG. 4 shows a transversal cross-sectional view of the module of FIG. 3.

An embodiment of a module which has been constructed in accordance with the present invention is shown in FIGS. 3 and 4. It comprises a module 40 having a tubular bundle 42 and an outer containing shell 44. The bundle is formed, similarly, to the procedures mentioned above, by winding one or more hollow filaments while the bundle is rotated at a constant speed with the filament(s) being guided back and forth to build successive layers. The helical path forming each layer or lamina is regulated by selecting the pitch of the path so that the overall length of fiber of each lamina is approximately constant.

The ends of the bundle 46 and 48 are potted by dipping them in a polymer compound and then allowing the compound deposited on the bundle to cure and solidify. Next a circumferential oblique cut 50 is made at end 46 to allow communication between some of the laminae and a first annular permeate collecting zone 52. Similarly a second cut 54 is made at second end 48 to allow communication between the remaining laminae and a second annular permeate collecting zone 56. While in FIG. 3, permeate collecting zones 54 and 56 are annular it should be understood other types of cuts could be made to achieve the same purpose. For example the cuts could be V-shaped. The identically functional pair of cuts 50 and 52 and the identically functional pair of cuts 54 and 56 partition bundle 42 into two sections. The first section 58 comprises all the laminae which communicate with cuts 50 and 52. The second section 60 comprises all the laminae which communicate with cuts 54 and 56. The pairs 50 and 52 and 54 and 56 lead respectively to separate collection zones. The two sections of the fiber bundle are tubular and concentric.

Between the tubular bundle 42 and the inner wall of shell 46, there is left a cylindrical space 62 which is used as the feed space. One or more inlet ports 64 are provided on the shell to feed a composite gas into said feed space. The module is also provided with an outlet port 66 which preferably extends axially into and through the center of the bundle as shown at 68. If a mandrel is used to wind the monofilament into the tubular shape, the mandrel is either provided with holes, or it is removed prior to the assembly of module 40 so that any gas disposed between the fibers or laminae of the bundle can flow into space 68 and from there out through port 66. Alternatively the bundle may be wound without a mandrel as shown in the U.S. Pat. No. 4,351,092. The two permeate collecting zones connecting separately to the pairs of slices 50/52 and 54/56 are provided with outlet points 70 and 72 respectively.

The module is operated as follows. A composite gas is fed through inlet(s) 64 into space 62 under pressure forcing the gas to flow through the bundle radially inward toward space 68. As the composite gas flows past the individual fibers which form the laminae of the first or outer section 58, a portion of the gas permeates the fiber walls and flows substantially perpendicularly or axially with respect to said composite gas toward first permeate collecting space 52. Gas depleted by the first section then flows past the laminae of the second or inner section 60 and again some of the gas permeates the wall of the laminae and flows axially toward second permeate collection space 56. The permeates from the collecting zones 52 and 56 are removed through corresponding PERMEATE outlets 70 and 72. The remaining gases flow into space 68 and axially out through outlet 66.

Inherently there is a pressure and composition gradient associated with the gas flowing through the bundle. Therefore the permeates obtained from two sections of the bundle also differ in pressure and concentration. Thus the improved single module of FIGS. 3 and 4 achieves a result which is similar and in some respects superior to that achieved by the scheme of FIG. 2 where two modules were required. The embodiment of FIGS. 3 and 4 illustrates how a fiber bundle can be subdivided into two sections so that permeate gas can be collected from each section. Obviously the same procedure could be used to partition the bundle in three or more sections and collect permeate from each.

The present invention provides a method and module having a plurality of individual stages having permeates which are separately available for further processing. Since the permeate can be selectively removed very high degree separation of different gases can be obtained. If required the permeates of some sections can be selectively removed and refluxed to improve the overall efficiency of the process.

I claim:

1. A module for separating a composite gas compromising:
   a shell with an inlet port, a residue outlet port and a plurality of permeate outlet ports for permeate of different concentrations; and a bundle of hollow fibers with walls which are permeable to a portion of said composite gas, said bundle being partitioned into several radially disposed sections, each section being connected to a respective permeate outlet port, whereby portions of said composite gas permeate the fiber walls of respective sections and flow to said permeate outlet port when said composite gas is forced to flow from said inlet port to said residue outlet port through said bundle and wherein said bundle has two axially spaced opposite ends, and wherein said bundle is portioned by providing cuts in said ends and wherein said cuts are made in said opposite ends for radially adjacent sections of said bundle and wherein said fibers for each lamina of said bundle are wound at a particular pitch with respect to a common shaft, said pitch being selected to provide respective lamina with a constant length of fiber.

2. The module of claim 1 wherein said bundle is cylindrical and hollow at the center.

3. The module of claim 2 wherein a feed space is left between said bundle and said shell which is connected to said inlet port, and said residue outlet port is connected to the center of said bundle whereby composite gas forced through said inlet port flows radially through said bundle toward said residue outlet port.

4. The module of claim 2 wherein said fibers are wound around a common shaft to form a plurality of concentric cylindrical laminae.

5. The module of claim 4 wherein said bundle is wound from a single continuous monofilament.

6. The module of claim 4 wherein the bundle is partitioned into tubular concentric sections.

7. The module of claim 4 wherein said lamina are arranged with the fibers substantially perpendicularly to the flow of the composite gas.

8. The module of claim 1 wherein said sections are constructed and arranged to force said gas to flow through said sections sequentially.

* * * * *